US012017219B2

(12) United States Patent
Liu et al.

(10) Patent No.: US 12,017,219 B2
(45) Date of Patent: Jun. 25, 2024

(54) MICRO-FLUIDIC SUBSTRATE, MICRO-FLUIDIC STRUCTURE AND DRIVING METHOD THEREOF

(71) Applicant: BOE TECHNOLOGY GROUP CO., LTD., Beijing (CN)

(72) Inventors: Yingming Liu, Beijing (CN); Xue Dong, Beijing (CN); Haisheng Wang, Beijing (CN); Xiaochuan Chen, Beijing (CN); Xiaoliang Ding, Beijing (CN); Lei Wang, Beijing (CN); Changfeng Li, Beijing (CN); Pinchao Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 246 days.

(21) Appl. No.: 17/726,119

(22) Filed: Apr. 21, 2022

(65) Prior Publication Data

US 2022/0241778 A1 Aug. 4, 2022

Related U.S. Application Data

(63) Continuation of application No. 16/633,016, filed as application No. PCT/CN2019/097548 on Jul. 24, 2019, now Pat. No. 11,331,666.

(30) Foreign Application Priority Data

Aug. 1, 2018 (CN) ........................ 201810866305.9

(51) Int. Cl.
*B01L 3/00* (2006.01)

(52) U.S. Cl.
CPC ... *B01L 3/50273* (2013.01); *B01L 2300/0645* (2013.01); *B01L 2400/0415* (2013.01)

(58) Field of Classification Search
CPC ......... B01L 2200/12; B01L 2300/0645; B01L 2300/0819; B01L 2300/165;
(Continued)

(56) References Cited

U.S. PATENT DOCUMENTS

2007/0138016 A1 6/2007 Wang
2010/0307922 A1 12/2010 Wu
2011/0042220 A1 2/2011 Wang

FOREIGN PATENT DOCUMENTS

CN 103386332 A * 11/2013
CN 103386332 A 11/2013
(Continued)

OTHER PUBLICATIONS

Extended European Search Report dated Mar. 10, 2022 for application No. EP19843941.6.
(Continued)

*Primary Examiner* — Jennifer Wecker
(74) *Attorney, Agent, or Firm* — Nath, Goldberg & Meyer; Joshua B. Goldberg

(57) ABSTRACT

The present disclosure provides a micro-fluidic substrate, a micro-fluidic structure and a driving method thereof. The micro-fluidic substrate of the preset disclosure includes a substrate, and a plurality of driving electrodes on the substrate and configured to drive a droplet to move, the plurality of driving electrodes being in a same layer with a gap space between adjacent driving electrodes. The micro-fluidic substrate further includes: at least one auxiliary electrode on the substrate and configured to drive the droplet to move, an orthographic projection of the auxiliary electrode on the substrate at least partially overlapping with an orthographic projection of the gap space on the substrate, and the auxiliary electrode and the driving electrodes being in different layers.

8 Claims, 8 Drawing Sheets

(58) Field of Classification Search
CPC ......... B01L 2400/0415; B01L 3/50273; B01L 3/502792
See application file for complete search history.

(56) References Cited

FOREIGN PATENT DOCUMENTS

| | | | |
|---|---|---|---|
| CN | 105572398 | A | 5/2016 |
| CN | 107649223 | A | 2/2018 |
| CN | 109465041 | A | 3/2019 |
| WO | 2014036915 | A1 | 3/2014 |
| WO | 2018093779 | A2 | 5/2018 |

OTHER PUBLICATIONS

Second Office Action dated Nov. 17, 2020 corresponding to Chinese application No. 201810866305.9.
Office action dated Jun. 8, 2020 for application No. CN201810866305.9 with English translation attached.
International Search Report dated Oct. 30, 2019 corresponding to application No. PCT/CN2019/097548.

* cited by examiner

MICRO-FLUIDIC SUBSTRATE, MICRO-FLUIDIC STRUCTURE AND DRIVING METHOD THEREOF

TECHNICAL FIELD

The disclosure belongs to the field of micro-fluidic technology in micro total analysis, and particularly relates to a micro-fluidic substrate, a micro-fluidic structure and a driving method thereof.

BACKGROUND

"Micro total analysis" is a technique for transferring the function of an analytical laboratory to a portable analytical device to the utmost extent by miniaturization and integration of chemical analytical devices. The micro-fluidic is an important means of micro total analysis, and is a technology for accurately controlling micro droplets to move according to a required track. The expected micro chemical reaction, biological detection and the like can be carried out by controlling the movement and separation of the droplets, so that the micro total analysis can be realized.

SUMMARY

In one aspect, the present disclosure provides a micro-fluidic substrate, including a substrate, and a plurality of driving electrodes on the substrate and configured to drive a droplet to move, the plurality of driving electrodes being in a same layer with a gap space between adjacent driving electrodes, wherein the micro-fluidic substrate further includes:

at least one auxiliary electrode on the substrate and configured to drive the droplet to move, an orthographic projection of the auxiliary electrode on the substrate at least partially overlapping with an orthographic projection of the gap space on the substrate, and the auxiliary electrode and the driving electrodes being in different layers.

According to an embodiment of the disclosure, the orthographic projection of the auxiliary electrode on the substrate at least covers the orthographic projection of the gap space on the substrate.

According to an embodiment of the disclosure, the orthographic projection of the auxiliary electrode on the substrate coincides with the orthographic projection of the gap space on the substrate.

According to an embodiment of the present disclosure, the plurality of driving electrodes are arranged in an array, with a row gap space between adjacent rows of the driving electrodes, and a column space between adjacent columns of driving electrodes; and the auxiliary electrode includes:

a first auxiliary electrode at least partially disposed in the row gap space and having a strip shape; and a second auxiliary electrode at least partially disposed in the column gap space and having a strip shape, the second auxiliary electrode being insulated from the first auxiliary electrode.

According to an embodiment of the disclosure, the second auxiliary electrode and the first auxiliary electrode are in different layers with an overlap between the second auxiliary electrode and the first auxiliary electrode, and an insulating layer is disposed between the second auxiliary electrode and the first auxiliary electrode at least at the overlap.

According to an embodiment of the disclosure, each of the row gap spaces is provided therein with the first auxiliary electrode having the strip shape; and each of the column gap spaces is provided therein with the second auxiliary electrode having the strip shape.

According to an embodiment of the present disclosure, the micro-fluidic substrate further includes a plurality of first gate lines extending in a row direction, a plurality of driving lines extending in a column direction, and a plurality of driving transistors, the plurality of driving transistors and the plurality of driving electrodes are arranged in an array and in one-to-one correspondence, with a row gap space between adjacent rows of the driving electrodes, and a column gap space between adjacent columns of the driving electrodes, wherein each of the driving electrodes is coupled to a first electrode of the driving transistor corresponding thereto, gate electrodes of the driving transistors corresponding to each row of driving electrodes are coupled to one of the first gate lines, and second electrodes of the driving transistors corresponding to each column of driving electrodes are coupled to one of the driving lines.

According to an embodiment of the present disclosure, the auxiliary electrode includes:

a first auxiliary electrodes at least partially disposed in the row gap space and having a strip shape; and a second auxiliary electrode at least partially disposed in the column gap space and having a strip shape, the second auxiliary electrode being insulated from the first auxiliary electrode, wherein the first gate lines are disposed in the row spaces, and the first auxiliary electrode is on a side of the first gate lines away from the substrate; and the driving lines are disposed in the column spaces, and the second auxiliary electrode is on a side of the driving lines away from the substrate.

According to an embodiment of the present disclosure, the micro-fluidic substrate comprises a plurality of auxiliary electrodes, the auxiliary electrodes each have a block shape, and each of the auxiliary electrodes is in the gap space between two adjacent driving electrodes and is electrically coupled to a corresponding one driving electrode of the driving electrodes adjacent to the auxiliary electrode.

According to an embodiment of the present disclosure, an orthographic projection of each of the auxiliary electrodes on the substrate at least partially overlaps with an orthographic projection of the corresponding one driving electrode coupled to the auxiliary electrode on the substrate, each of the auxiliary electrodes being electrically coupled to the corresponding one driving electrode through a via hole penetrating through an insulating layer between the auxiliary electrode and the corresponding one driving electrode.

According to an embodiment of the present disclosure, the auxiliary electrode is on a side of the driving electrodes away from the substrate.

According to an embodiment of the present disclosure, the auxiliary electrode is made of a metal material.

According to an embodiment of the present disclosure, the micro-fluidic substrate further includes a plurality of photosensitive elements on the substrate.

According to the embodiment of the disclosure, orthographic projections of the photosensitive elements on the substrate are covered by orthographic projections of the driving electrodes on the substrate; and the driving electrodes are on a side of the photosensitive elements away from the substrate and are made of a transparent conductive material.

According to an embodiment of the present disclosure, the micro-fluidic substrate further includes a plurality of second gate lines extending in a row direction, a plurality of detection lines extending in a column direction, and a plurality of detection transistors in one-to-one correspondence with the photosensitive elements;

the plurality of photosensitive elements are arranged in an array, each of the photosensitive elements is coupled to a first electrode of a corresponding one of the detection transistors, gate electrodes of the detection transistors corresponding to each row of the photosensitive elements are coupled to one of the second gate lines, and second electrodes of the detection transistors corresponding to each column of the photosensitive elements are coupled to one of the detection lines.

In another aspect, the present disclosure provides a micro-fluidic structure including:

a micro-fluidic substrate according to an embodiment of the present disclosure; and a counter substrate opposite to the micro-fluidic substrate, a side of the micro-fluidic substrate provided with the driving electrodes faces the counter substrate, a side of the counter substrate facing the micro-fluidic substrate is provided with a common electrode facing each of the driving electrodes, and a space for accommodating a droplet is between the micro-fluidic substrate and the counter substrate.

According to an embodiment of the present disclosure, a lyophobic layer is disposed on a side of the micro-fluidic substrate closest to the counter substrate; and a lyophobic layer is disposed on a side of the counter substrate closest to the micro-fluidic substrate.

According to the embodiment of the present disclosure, the micro-fluidic substrate is the micro-fluidic substrate having photosensitive elements, and the counter substrates further includes:

an optical waveguide layer configured to guide and direct light towards the micro-fluidic substrate.

In another aspect, the present disclosure provides a method of driving a micro-fluidic structure, including:

applying a common voltage to the common electrode, applying a driving voltage to the driving electrode at a first position, and applying the driving voltage to the auxiliary electrode at a second position to form a driving electric field to drive the droplet to move, wherein the first position represents a position of the driving electrode to which the droplet is to be moved in a moving direction of the droplet, and the second position represents a position of the auxiliary electrode to which the droplet is to be moved in the moving direction of the droplet.

According to an embodiment of the present disclosure, the driving voltage applied to the auxiliary electrode is equal to the driving voltage applied to at least one of the driving electrodes adjacent to the auxiliary electrode.

DETAILED DESCRIPTION

In order that those skilled in the art will better understand the technical solutions of the present disclosure, the following detailed description is given with reference to the accompanying drawings and the specific embodiments.

In the present disclosure, two structures "disposed in a same layer" mean that they are formed by a same material layer through a photolithography process or the like, and therefore they are in the same layer in the stacking relationship; however, it does not mean that they are equidistant from the substrate, nor means that other layer structures interposed between the substrate and each of the two structures are the same.

In the present disclosure, two structures "disposed in different layers" mean that the two structures are not "disposed in the same layer" as defined above, but are disposed in different layers; however, it does not necessarily mean that their distances from the substrate are different.

In the present disclosure, the case where structure A is disposed on "a side of structure B away from the substrate" means that structure A and structure B are disposed on the same side of the substrate but in different layers, and the layer in which structure A is disposed is farther away from the substrate than the layer in which structure B is disposed. Therefore, if both structure A and structure B exist at the same position in a horizontal direction, structure A is necessarily farther from the substrate than structure B, but it does not mean that the distance between structure A and the substrate at any position in the horizontal direction is larger than the distance between structure B and the substrate at any position in the horizontal direction.

In the present disclosure, “row” and “column” merely mean two intersecting (especially orthogonal) and relative directions, regardless of the shape, placement, etc. of the substrate product.

Figure 1:
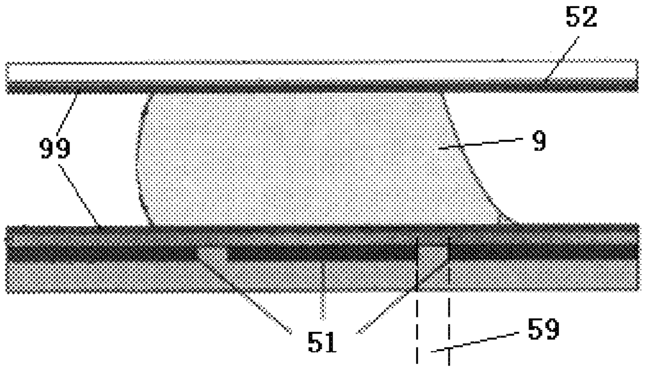
FIG. 1 is a schematic diagram of a micro-fluidic structure in driving a droplet to move.

As shown in FIG. 1, a conventional micro-fluidic structure includes two opposing substrates, one of which is provided with an array of driving electrodes 51, the other of which is provided with a common electrode 52. Two respective sides of the two substrates, that face each other, are each provided with a lyophobic layer 99 (i.e., a layer having lyophobicity to a droplet), and the droplet 9 is between the two lyophobic layers 99. When a predetermined common voltage is applied to the common electrode 52, a predetermined driving electric field can be caused at and around the droplet 9 by applying different driving voltages to the driving electrodes 51 at different positions relative to the droplet 9, which causes specific deformation and movement of the droplet 9, thereby controlling the droplet 9.

It is noted that, in order to avoid the electric conduction between different driving electrodes 51, there is a gap space 59 between adjacent driving electrodes 51, and no electric field is formed at the gap space 59. Therefore, if the gap space 59 is too large, the droplet 9 cannot move continuously during the movement of the droplet 9, and if the gap space is too small, adjacent driving electrodes 51 are liable to be electrically coupled, which results in failure of the fabricated micro-fluidic structure.

The present embodiment provides a micro-fluidic substrate including a substrate provided with a plurality of driving electrodes for driving a droplet to move. The driving electrodes are disposed in the same layer, and a gap space is between adjacent driving electrodes. The micro-fluidic substrate further includes at least one auxiliary electrode on the substrate and configured to drive the droplet to move, and the auxiliary electrode is at least partially disposed in the gap space and is in a different layer from the driving electrodes.

According to an embodiment of the present disclosure, the auxiliary electrode and the driving electrodes are in different layers, which may mean that the auxiliary electrode and the driving electrodes are spaced apart from each other in a thickness direction by an insulating layer.

Figure 13:
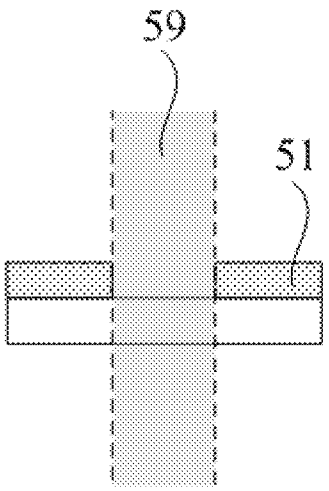
FIG. 13 is a diagram illustrating a positional relationship between a gap space and a driving electrode in a micro-fluidic substrate according to an embodiment of the present disclosure.

In an embodiment of the present disclosure, as shown in FIG. 13, the term “gap space” indicates a gap between adjacent driving electrodes 51 and all spaces vertically above and vertically under the gap (i.e., a gray region in FIG. 13). That is, a portion between and surrounded by adjacent driving electrodes is the gap, and the gap and its extension portion in the direction perpendicular to the substrate is the gap space.

In the micro-fluidic substrate of the embodiment, the auxiliary electrode capable of driving the droplet to move is disposed at the gap space between the driving electrodes. The auxiliary electrode and the driving electrodes are in different layers, and thus the auxiliary electrode and the driving electrodes may overlap with each other. Therefore, the driving electric field can be formed at the gap space between the driving electrodes, thereby eliminating or reducing the space where the driving electric field cannot be formed, and controlling the droplet more smoothly.

As shown in FIGS. 2 to 13, the present embodiment provides a micro-fluidic substrate, which includes:

a substrate 8;

a plurality of driving electrodes 51 disposed on the substrate 8 and configured to drive the droplet 9 to move, the driving electrodes 51 being in a same layer with a gap space 59 between every two adjacent driving electrodes 51; and at least one auxiliary electrode 6 disposed on the substrate 8 and configured to drive the movement of the droplet 9, the auxiliary electrode 6 being at least partially provided in the gap space 59 and in a different layer from the driving electrodes 51.

The substrate 8 is a substrate for carrying other structures, and may have a plate shape. The plurality of driving electrodes 51 are disposed in a same layer and arranged in an array (e.g., a rectangular array), and are configured to apply a driving voltage to drive the droplet 9 to move. It is noted that, since the driving electrodes 51 are disposed in the same layer with a gap space provided therebetween, the driving electrodes 51 cannot contact each other, so as to ensure that different driving electrodes 51 are insulated from each other.

In the micro-fluidic substrate of the embodiment, the auxiliary electrode 6 is further provided in the gap space 59 between the driving electrodes 51. In the embodiment, the auxiliary electrode 6 is disposed on a side of the substrate 8 provided with the driving electrodes 51. The auxiliary electrode 6 can also be applied with the driving voltage to drive the droplet 9 to move, thereby eliminating or reducing the space where the driving electric field cannot be formed, and controlling the droplet 9 more smoothly.

According to an embodiment of the present disclosure, an orthographic projection of the auxiliary electrode 6 on the substrate 8 at least covers an orthographic projection of the gap space 59 on the substrate 8.

According to an embodiment of the present disclosure, the orthographic projection of the auxiliary electrode 6 on the substrate 8 coincides with the orthographic projection of the gap space 59 on the substrate 8.

Figure 2:
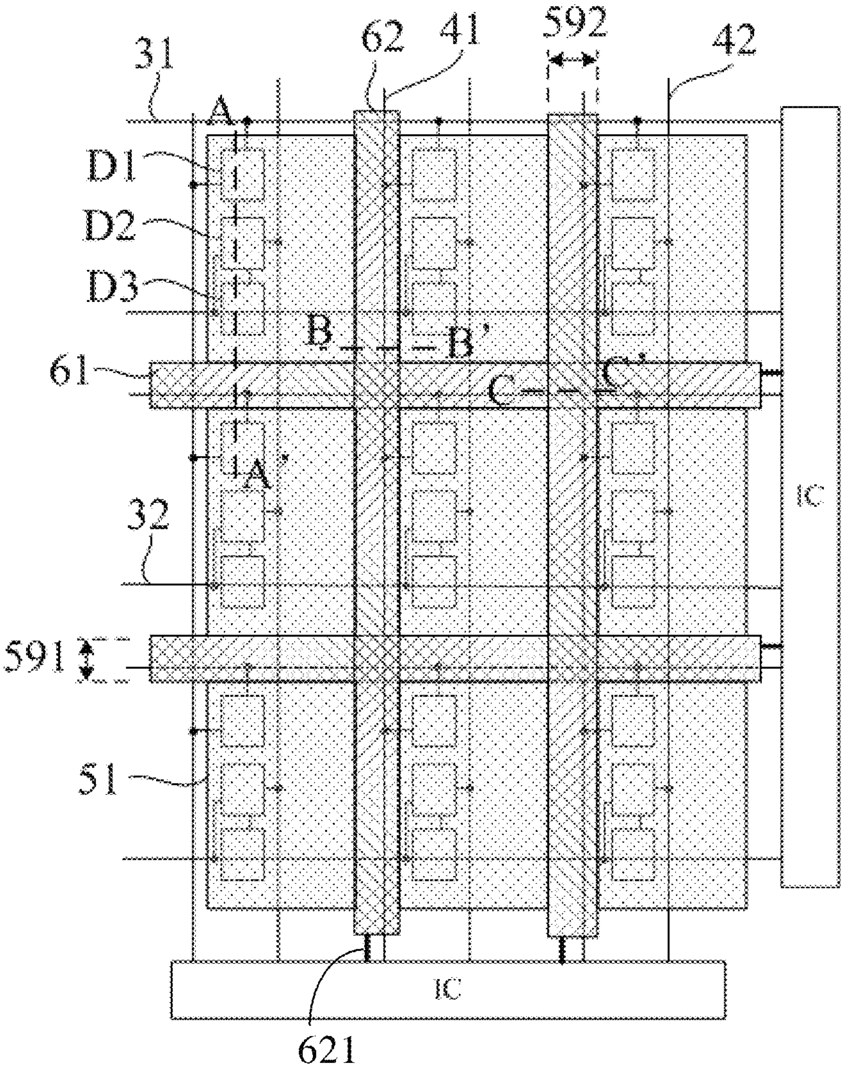
FIG. 2 is a schematic diagram of a partial structure of a micro-fluidic substrate according to an embodiment of the present disclosure.
Figure 3:
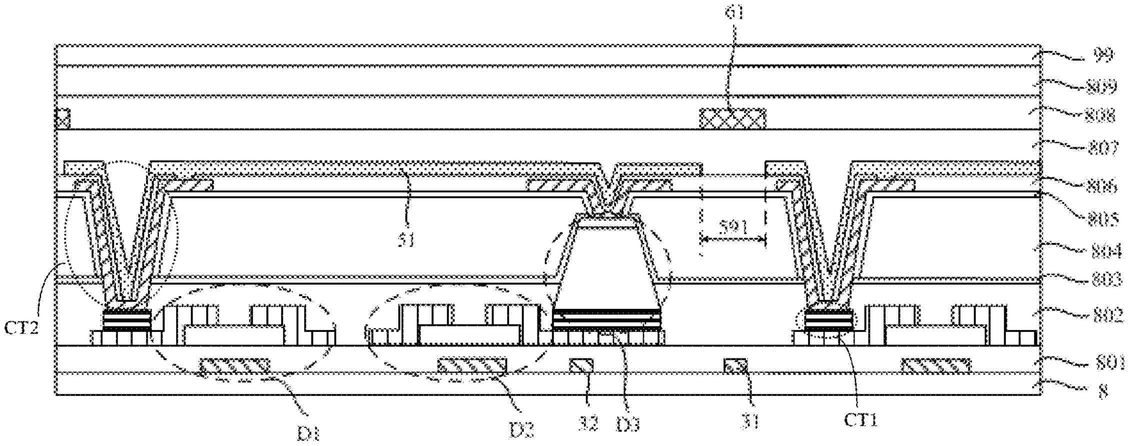
FIG. 3 is a schematic cross-sectional view taken along line A-A' of FIG. 1.
Figure 4:
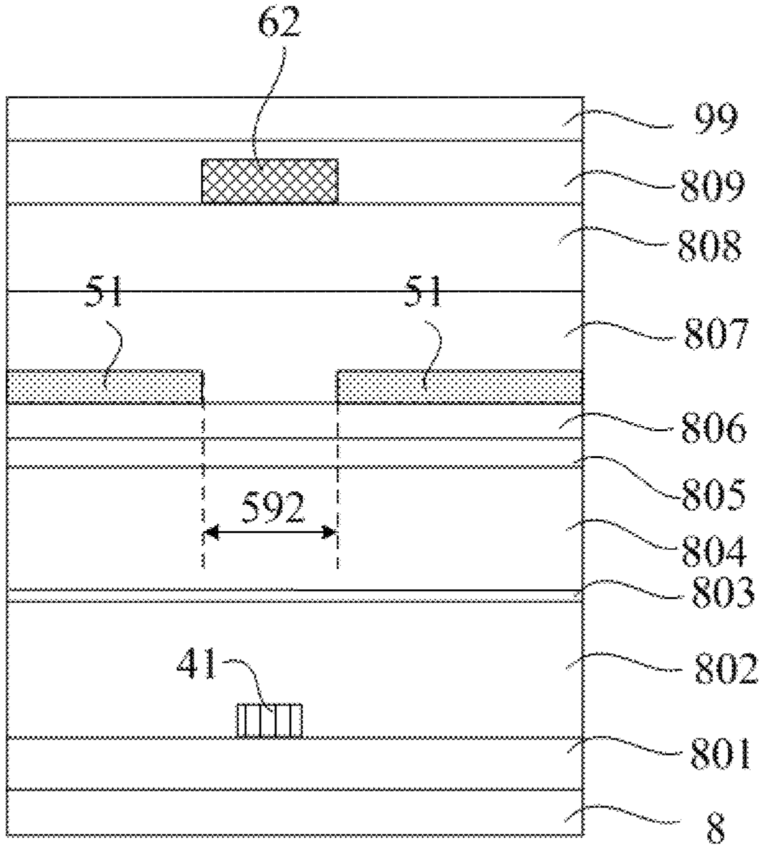
FIG. 4 is a schematic cross-sectional view taken along line B-B' of FIG. 1.

The auxiliary electrode 6 and the driving electrodes 51 are in different layers, and therefore, different driving electrodes 51 will be not electrically connected with each other even if the orthographic projection of the auxiliary electrode 6 on the substrate overlaps with the orthographic projection of the driving electrodes 51 on the substrate 8. As shown in FIGS. 2 to 4, the auxiliary electrode 6 (e.g., a first auxiliary electrode 61 and a second auxiliary electrode 62 described later) may cover the gap space 59 (e.g., a row gap space 591 and a column gap space 592 described later) where the auxiliary electrode 6 is located, for example, may extend beyond the gap space 59, referring to FIG. 6, to completely eliminate the space where the driving electric field cannot be formed. According to an embodiment of the present disclosure, in order to prevent the auxiliary electrode 6 from affecting the electric field caused by the driving electrodes 51 themselves, the orthographic projection of the auxiliary electrode 6 on the substrate 8 may completely overlap with the orthographic projection of the gap space 59 where the auxiliary electrode 6 is located.

According to the embodiment of the present disclosure, the auxiliary electrode 6 is disposed on the side of the driving electrodes 51 away from the substrate 8.

As shown in FIGS. 3 and 4, when the auxiliary electrode 6 and the driving electrodes 51 are disposed on the same side of the substrate 8, the auxiliary electrode 6 can be farther away from the substrate 8 than the driving electrodes 51, so that the process for fabricating the structure related to the driving electrodes 51 does not need to be changed, and the process can be easily implemented by adding a step of fabricating the auxiliary electrode 6 after the driving electrodes 51 are fabricated.

According to an embodiment of the present disclosure, the auxiliary electrode 6 may be made of a metal material.

According to an embodiment of the present disclosure, the driving electrodes 51 are arranged in an array, with a row gap space 591 between adjacent rows of driving electrodes 51 and a column gap space 592 between adjacent columns of driving electrodes 51.

According to an embodiment of the present disclosure, the auxiliary electrode 6 includes a first auxiliary electrode 61 at least partially disposed in the row gap space 591 and having a strip shape, and a second auxiliary electrode 62 at least partially disposed in the column gap space 592 and having a strip shape, the second auxiliary electrode 62 being insulated from the first auxiliary electrode 61.

As shown in FIG. 2, the driving electrodes 51 are usually disposed in a matrix in a plurality of rows and columns, so that a plurality of "row gap spaces 591" extending in a row direction and a plurality of "column gap spaces 592" extending in the column direction may be formed therein, and the auxiliary electrodes 6 may include first auxiliary electrodes 61 arranged along the row gap spaces 591 and second auxiliary electrodes 62 arranged along the column gap spaces 592. In this case, the first auxiliary electrodes 61 and the second auxiliary electrodes 62 are insulated to avoid signal interference therebetween.

According to an embodiment of the present disclosure, each row gap space 591 is provided with one first auxiliary electrode 61 having a strip shape, and each column gap space 592 is provided with one second auxiliary electrode 62 having a strip shape.

That is, the first auxiliary electrodes 61 may be disposed in all of the row gap spaces 591, there is only one first auxiliary electrode 61 in each row gap space 591, and the one first auxiliary electrode 61 fills the row gap space 591; similarly, there is only one second auxiliary electrode 62 in each column gap space 592 and the one second auxiliary electrode 62 fills the column gap space 592. In other words, the auxiliary electrode 6 completely occupies the space of the gap space 59 when viewed in a plan view. In this way, all of the gap spaces 51 may be filled with the auxiliary electrodes 6, thereby completely eliminating the space where the driving electric field cannot be formed, and improving the driving accuracy. Since only one auxiliary electrode 6 is provided in each gap space 59, the total number of auxiliary electrodes 6 is not too large, which facilitates the control thereof. For example, a signal can be directly provided to one auxiliary electrode 6 through each port of a driving chip (IC).

According to an embodiment of the present disclosure, the second auxiliary electrode 62 and the first auxiliary electrode 61 are in different layers with an overlap therebetween, and an insulating layer is disposed between the second auxiliary electrode 62 and the first auxiliary electrode 61 at least at the overlap.

Figure 5:
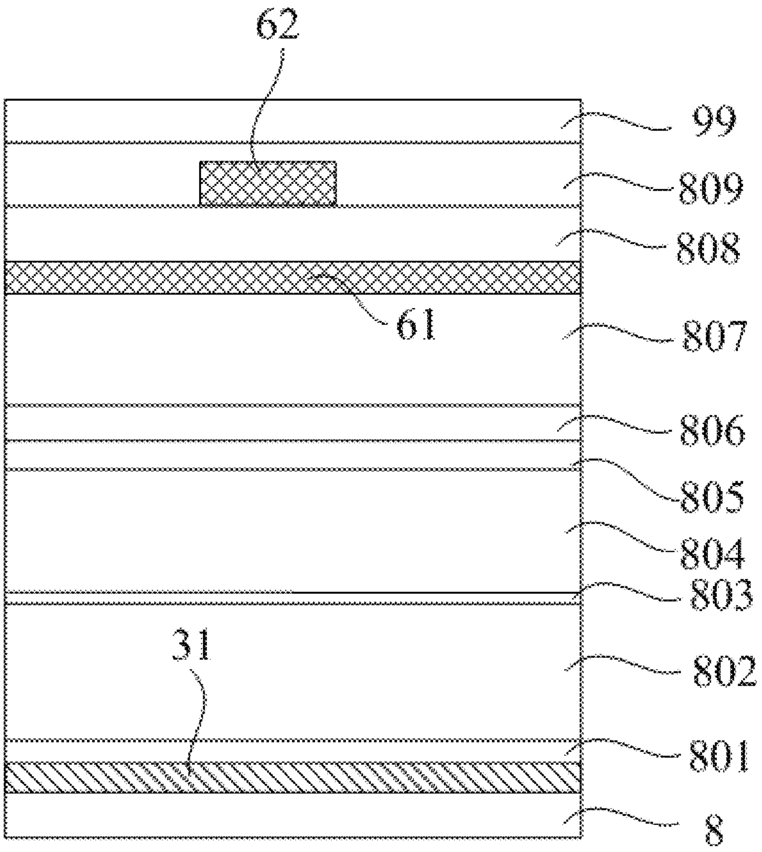
FIG. 5 is a schematic cross-sectional view taken along line C-C' of FIG. 1.

When the first auxiliary electrode 61 and the second auxiliary electrode 62 fill the row gap space 591 and the column gap space 592, respectively, they must overlap, as shown in FIG. 2, at the intersection of the row gap space 591 and the column gap space 592. To simplify the structure, the first auxiliary electrode 61 and the second auxiliary electrode 62 may be in different layers, and as shown in FIG. 5, they may be separated by an insulating layer (e.g., a fourth passivation layer 808) at the overlap.

According to an embodiment of the present disclosure, the micro-fluidic substrate further includes a plurality of first gate lines 31 extending in the row direction, a plurality of driving lines 41 extending in the column direction, and a plurality of driving transistors D1. In an embodiment, each of the driving electrodes 51 and each of the driving transistors D1 are disposed between adjacent first gate lines 31 and between adjacent driving lines 41. The driving transistor D1 is configured to control the driving voltage applied to the driving electrode 51 to drive the droplet 9 on the driving electrode to move. In the embodiment, the driving electrode 51 corresponds to the driving transistor D1 that controls the driving electrode 51.

According to an embodiment of the present disclosure, the driving electrodes 51 are arranged in an array, with a row gap space 591 between adjacent rows of the driving electrodes 51 and a column gap space 592 between adjacent columns of the driving electrodes 51.

Figure 14:
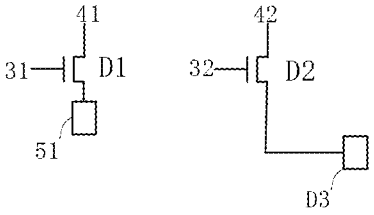
FIG. 14 is a schematic diagram illustrating a connection relationship among a driving transistor, a driving electrode, a first gate line, and a driving line, and a connection relationship among a detection transistor, a photosensitive element, a second gate line, and a detection line.

According to an embodiment of the present disclosure, referring to FIG. 2 and FIG. 14 showing details of a part of FIG. 2, each driving electrode 51 is coupled to a first electrode of the driving transistor D1 corresponding thereto, gate electrodes of respective driving transistors D1 corresponding to each row of driving electrodes 51 are coupled to one of the first gate lines 31, and second electrodes of respective driving transistors D1 corresponding to each column of driving electrodes 51 are coupled to one of the driving lines 41.

As shown in FIG. 2, since the number of the driving electrodes 51 is large, they can be controlled by a transistor array. That is, a turn-on signal is provided to respective first gate lines 31 in turn, so that respective rows of the driving transistors D1 are turned on in turn. When a certain row of the driving transistors D1 are turned on, driving voltages can be provided to the row of respective driving electrodes 51 through respective driving lines 41. Thus, a large number of driving electrodes 51 can be controlled with a few lead wires.

According to an embodiment of the present disclosure, the auxiliary electrode 6 includes the first auxiliary electrode 61 and the second auxiliary electrode 62. The first gate line 31 is disposed in the row gap space 591, the first auxiliary electrode 61 is also disposed in the row gap space 591 where the first gate line 31 is disposed, and the first auxiliary electrode 61 is on a side of the first gate line 31 away from the substrate 8 (see FIG. 3). The driving line 41 is disposed in the column gap space 592, and the second auxiliary electrode 62 is disposed in the column gap space 592 where the driving line 41 is disposed, and the second auxiliary electrode 62 is located on a side of the driving line 41 away from the substrate 8 (see FIG. 4).

According to an embodiment of the disclosure, the first gate line 31, the driving line 41, the first auxiliary electrode 61 and the second auxiliary electrode 62 may be disposed on the same side of the substrate, as shown in FIGS. 2, 3 and 4, the first gate line 31 and the driving line 41 may also be respectively in the row gap space 591 and the column gap space 592. At this time, the corresponding first auxiliary electrode 61 and the corresponding second auxiliary electrode 62 are respectively above the first gate line 31 and the driving line 41, so as to shield the signals in the first gate line 31 and the driving line 41 from affecting the droplet 9.

Figure 6:
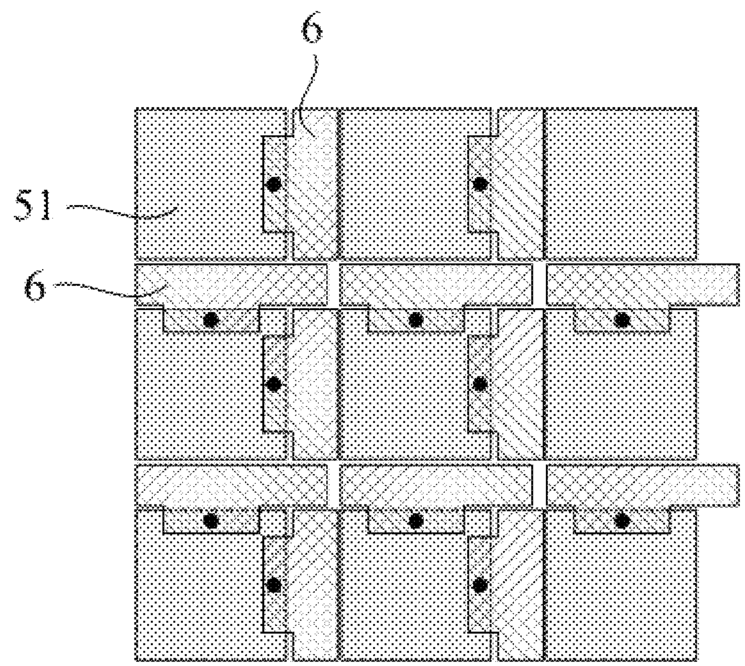
FIG. 6 is a schematic diagram of a partial structure of another micro-fluidic substrate according to an embodiment of the present disclosure.

According to an embodiment of the present disclosure, referring to FIG. 6, the auxiliary electrodes 6 each have block shape, and each auxiliary electrode 6 is located in the gap space 59 between two adjacent driving electrodes 51 and is electrically coupled to one driving electrode 51 adjacent thereto.

That is, as shown in FIG. 6, the auxiliary electrode 6 may not have a shape of strip, but may have a shape of "small block", and each auxiliary electrode 6 is only located between two adjacent driving electrodes 51, and at the same time, the auxiliary electrode 6 is also electrically coupled to one of the driving electrodes 51 adjacent to the auxiliary electrode (for example, electrically coupled through a via hole penetrating through an insulating layer between the auxiliary electrode 6 and the one driving electrode 51, and a black dot in FIG. 6 represents a via hole), so that the signal via the auxiliary electrode 6 is the same as the signal via the one driving electrode 51. Thus, the driving electrode 51 is "expanded" into the gap space 59, and thus, the space where the driving electric field cannot be formed can be reduced.

It is noted that, respective sides of one driving electrode 51 are provided with the gap spaces 59. The auxiliary electrodes 6 having a block shape may be provided in each of the gap spaces 59, or only some of the gap spaces 59 are provided with the auxiliary electrode 6, or none of the gap spaces 59 provided with the auxiliary electrode 6. Each of the driving electrodes 51 may be coupled to only one auxiliary electrode 6 adjacent thereto, may be coupled to a plurality of auxiliary electrodes 6, or may not be coupled to any of the auxiliary electrodes 6.

It is noted that, in view of a regular layout, each driving electrode 51 is coupled to the auxiliary electrodes 6 at gap spaces 59 on the same side of the driving electrode 51. For example, each of the driving electrodes 51 may be coupled to the auxiliary electrodes 6 on the right and upper sides thereof, as shown in FIG. 6.

According to an embodiment of the present disclosure, the micro-fluidic substrate further includes a plurality of photosensitive elements D3 on the substrate 8.

In the micro-fluidic technology, in many cases, only the position of the droplet 9 is determined can the droplet be driven. In addition, in some cases, the concentration, composition, etc. of the droplet 9 need to be detected, which can be implemented by setting the photosensitive element D3 (which may be disposed on a side of the substrate 8 provided with the driving electrodes 51), and therefore the photosensitive element D3 may be disposed on the substrate 8.

Figure 10:
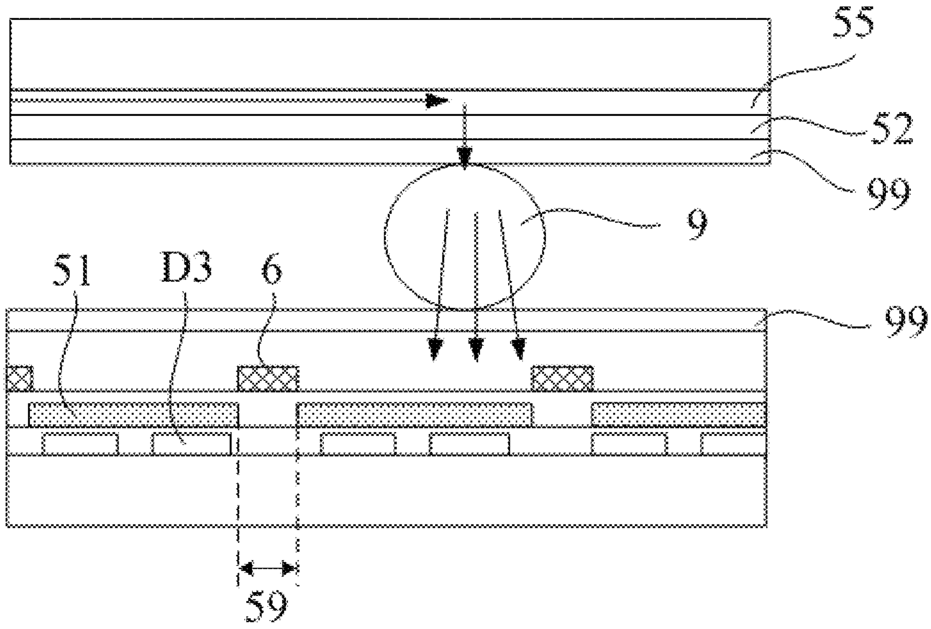
FIG. 10 is a schematic diagram of a partial cross-section of a micro-fluidic structure according to an embodiment of the present disclosure.
Figure 11:
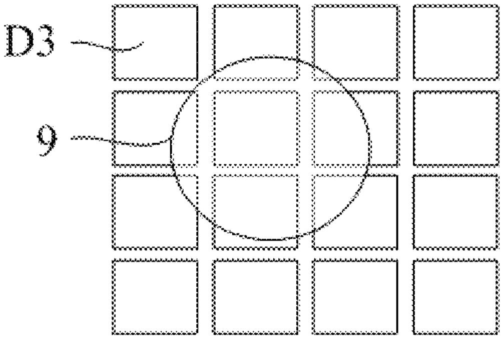
FIG. 11 is a schematic diagram of a micro-fluidic substrate in determination of the position of a droplet according to an embodiment of the present disclosure.

According to an embodiment of the present disclosure, as shown in FIG. 10 (for simplicity, part of the structure is not shown in the figure), light can be transmitted to the substrate 8 of the micro-fluidic substrate through an optical waveguide layer 55 and the like provided on the counter substrate. It is noted that, since parameters such as the intensities of light passing through the droplet 9 and light not passing through the droplet 9 are different, as shown in FIG. 11, it can be determined which photosensitive elements D3 have the droplet 9 above them by analyzing the light detected by each photosensitive element D3, that is, the positioning of the droplet 9 can be achieved.

Similarly, after light passes through the droplet 9, parameters of the light, such as the intensity of light, become varied with the concentration, composition, and the like of the droplets 9. Therefore, the detection of the concentration, composition, and the like of the droplets 9 can be achieved by analyzing the light detected by the photosensitive element D3.

In an embodiment, as shown in FIG. 3, the photosensitive element D3 may be a photodiode or the like, which will not be described in detail herein.

The photosensitive elements D3 may be in one-to-one correspondence with the driving electrodes 51 as shown in FIG. 2. Alternatively, as shown in FIG. 10, the number of the photosensitive elements D3 and the number of the driving electrodes 51 may be different.

According to an embodiment of the present disclosure, the orthographic projection of the photosensitive element D3 on the substrate 8 is covered by the orthographic projection of the driving electrode 51 on the substrate 8;

the driving electrode 51 is on the side of the photosensitive element D3 away from the substrate 8, and is made of a transparent conductive material.

The photosensitive element D3 only needs to receive light without causing an electric field, and thus, as shown in FIGS. 2 and 3, it may be disposed under the driving electrodes 51 (in this case, the driving electrodes 51 are transparent), so that the area of the driving electrodes 51 is not reduced, and the electric field caused by the driving electrodes 51 is not affected.

According to an embodiment of the present disclosure, the micro-fluidic substrate further includes a plurality of second gate lines 32 extending in the row direction, a plurality of detection lines 42 extending in the column direction, and a plurality of detection transistors D2 corresponding to the photosensitive elements D3 in one-to-one correspondence.

Referring to FIGS. 2 and 14, the plurality of photosensitive element D3 are arranged in an array, each photosensitive element D3 is coupled to a first electrode of detection transistor D2 corresponding thereto, gate electrodes of respective detection transistors D2 corresponding to each row of photosensitive elements D3 are coupled to one second gate line 32, and second electrodes of respective detection transistors D2 corresponding to each column of photosensitive elements D3 are coupled to one detection line 42.

That is, as shown in FIG. 2, the photosensitive elements D3 may also be controlled by a transistor array (where the second gate line 32 and the detection line 42 may or may not be in the gap space 59). When a turn-on signal is provided through one of the second gate lines 32, a corresponding row of the detection transistors D2 are turned on, so that the light intensity signals detected by the photosensitive elements D3 in the corresponding row can be respectively output through the corresponding detection lines 42.

According to an embodiment of the present disclosure, in order to simplify the process, many structures may be disposed in the same layer. For example, referring to FIGS. 3 to 5, the second gate line 32 and the first gate line 31 may be disposed in the same layer, the gate electrodes of the detection transistor D2 and the driving transistor D1 may be disposed in the same layer as the second gate line 32 and the first gate line 31, the source electrodes and the drain electrodes of the detection transistor D2 and the driving transistor D1 may be disposed in the same layer, and the driving line 41 and the detection line 42 may be disposed in the same layer.

According to an embodiment of the present disclosure, the micro-fluidic substrate may further have other desired structures, such as an insulating layer for separating different conductive structures, a planarization layer (or resin layer) for eliminating a step difference, a lyophobic layer 99 on the uppermost layer, and the like.

Figure 12:
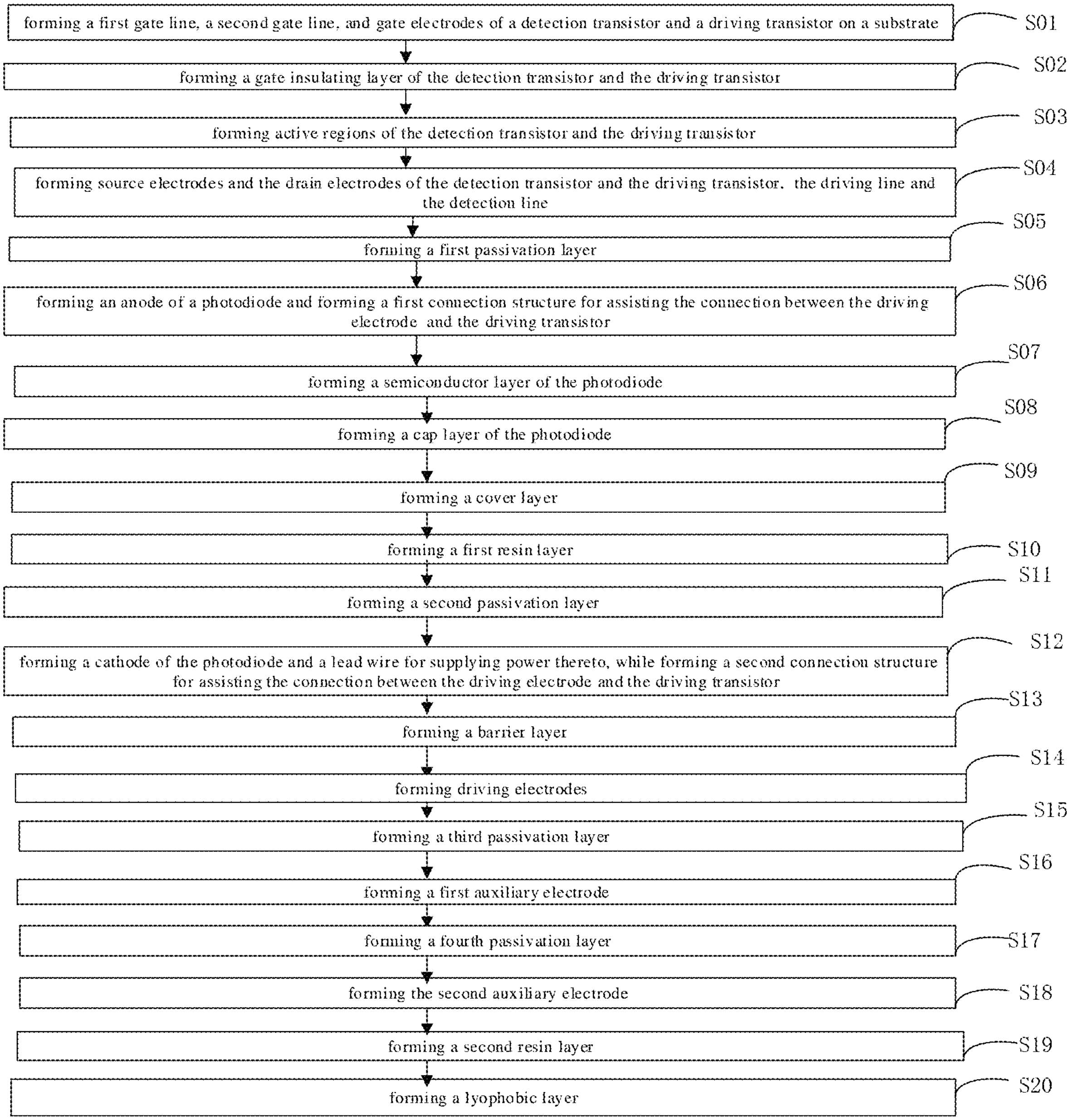
FIG. 12 is a flow diagram of fabrication process of a micro-fluidic substrate according to an embodiment of the present disclosure.

According to an embodiment of the present disclosure, as shown in FIGS. 2 and 12, a method of fabricating a micro-fluidic substrate may include steps S01 to S20.

Step S01 includes forming a first gate line 31, a second gate line 32, and gate electrodes of a detection transistor D2 and a driving transistor D1 on a substrate 8.

Step S02 includes forming a gate insulating layer 801 of the detection transistor D2 and the driving transistor D1. The gate insulating layer 801 covers the first gate line 31, the second gate line 32, and the gate electrodes of the detection transistor D2 and the driving transistor D1, and the first gate line 31, the second gate line 32, and the gate electrodes of the detection transistor D2 and the driving transistor D1 are spaced apart from each other by the gate insulating layer 801.

Step S03 includes forming active regions of the detection transistor D2 and the driving transistor D1 on the gate insulating layer 801.

Step S04 includes forming source electrodes and drain electrodes of the detection transistor D2 and the driving transistor D1, the driving line 41 and the detection line 42 on the gate insulating layer 801.

Step S05 includes forming a first passivation layer (PVX) 802, and the first passivation layer 802 covers the source electrodes and the drain electrodes of the detection transistor D2 and the driving transistor D1, the driving line 41, and the detection line 42 and insulates them from each other.

Step S06 includes etching the first passivation layer 802 to expose a first electrode (which may be a source electrode or a drain electrode) of the detection transistor D2 and a first electrode (which may be a source electrode or a drain electrode) of the driving transistor D1. Step S06 further includes forming an anode of a photodiode (an example of the photosensitive element D3) on the first electrode of the detection transistor D2 and forming a first connection structure CT1 for assisting the connection between the driving electrode 51 and the driving transistor D1 on the first electrode of the driving transistor D1. The anode and the first connection structure CT1 are, for example, portions defined by thick solid lines in FIG. 3 and may be made of metal materials.

Step S07 includes forming a semiconductor layer of the photodiode on the anode. The photodiode may be a PIN photodiode.

Step S08 includes forming a cap layer of the photodiode on the semiconductor layer, which may be made of transparent conductive material such as Indium Tin Oxide (ITO).

Step S09 includes forming a cover layer 803 to cover the photodiode and the first passivation layer.

Step S10 includes forming a first resin layer 804 cover the cover layer 803.

Step S11 includes forming a second passivation layer 805 to cover the first resin layer 804. The formation of the second passivation layer 805 may include processes such as etching and deposition, which will not be described in detail herein.

Step S12 includes forming a cathode of the photodiode and a lead wire for supplying power thereto, while forming a second connection structure CT2 for assisting the connection between the driving electrode 51 and the driving transistor D1. The formation of the second connection structure CT2 may include a process such as deposition.

Step S13 includes forming a barrier layer 806 on a portion of the second passivation layer 805 not covered by the second connection structure CT2.

Step S14 includes forming driving electrodes 51 spaced apart from each other on the barrier layer 806 and the second connection structure CT2.

Step S15 includes forming a third passivation layer 807, the third passivation layer 807 covering the driving electrodes 51 and insulating the driving electrodes 51 from each other.

Step S16 includes forming a first auxiliary electrode 61 on the third passivation layer 807.

Step S17 includes forming a fourth passivation layer 808 on the third passivation layer 807 and the first auxiliary electrode 61, the fourth passivation layer 808 serving as the insulating layer for separating the first auxiliary electrode 61 from the second auxiliary electrode 62 as described above.

Step S18 includes forming the second auxiliary electrode 62 on the fourth passivation layer 808 (see FIG. 4).

Step S19 includes forming a second resin layer 809 to cover the second auxiliary electrode 62.

Step S20 includes forming a lyophobic layer 99 on the second resin layer 809.

The structure and the fabricating method of the micro-fluidic substrate of the embodiment may have various modifications. For example, each transistor can also be a top-gate structure. For another example, and the positions of the layers in which the first auxiliary electrode 61 and the second auxiliary electrode 62 are located can be interchanged, and the details thereof will not be described herein. In addition, a lead wire for connecting the auxiliary electrode 6 (e.g., a lead wire 621 for connecting the second auxiliary electrode 62) may be formed.

As shown in FIGS. 2 to 13, the present embodiment provides a micro-fluidic structure, which includes: a micro-fluidic substrate according to an embodiment of the present disclosure; and a counter substrate opposite to the micro-fluidic substrate. A side of the micro-fluidic substrate provided with the driving electrodes 51 faces the counter substrate, a side of the counter substrate facing the micro-fluidic substrate is provided with a common electrode facing each of the driving electrodes 51, and a space for accommodating the droplet 9 is between the micro-fluidic substrate and the counter substrate.

That is, the above micro-fluidic substrate and the counter substrate can be disposed opposite to each other to form a micro-fluidic structure, in which the counter substrate has the common electrode 52, so that a required driving electric field can be formed between the two substrates to drive the droplet 9 therebetween to move.

According to an embodiment of the present disclosure, a lyophobic layer 99 is disposed on a side of the micro-fluidic substrate closest to the counter substrate; and a lyophobic layer 99 is disposed on a side of the counter substrate closest to the micro-fluidic substrate.

That is, the lyophobic layers 99 (i.e., layers having liquid repellency to the droplet 9) are provided on the opposite sides of the above two substrates so that a predetermined contact angle can be formed between the lyophobic layers 99 and the droplet 9 contacting them, which facilitates the movement of the droplet. In an embodiment, the lyophobic layers 99 may be made of a material such as teflon.

According to an embodiment of the present disclosure, when the micro-fluidic substrate is a micro-fluidic substrate having a photosensitive element D3, the counter substrate further includes an optical waveguide layer 55 for guiding and directing light towards the micro-fluidic substrate.

As shown in FIG. 10 (for simplicity, part of the structure is not shown), when the micro-fluidic substrate has the photosensitive element D3, a corresponding optical waveguide layer 55 may be disposed in the counter substrate to guide light incident from a right or left side and direct the light toward the micro-fluidic substrate.

According to an embodiment of the present disclosure, the optical waveguide layer may not be provided, and the light may be emitted toward the micro-fluidic substrate by a light source located on a side of the transparent counter substrate away from the micro-fluidic substrate.

As shown in FIGS. 2 to 13, the present embodiment provides a method for driving a micro-fluidic structure, including:

applying a common voltage to the common electrode 52, applying a driving voltage to the driving electrode 51 at a first position, and applying the driving voltage to the auxiliary electrode 6 at a second position to form a driving electric field to drive the droplet 9 to move, wherein the first position represents a position of the driving electrode 51 to which the droplet 9 is to be moved in a moving direction of the droplet 9, and the second position represents a position of the auxiliary electrode to which the droplet 9 is to be moved in the moving direction of the droplet 9.

That is, when the droplet 9 is driven using the above micro-fluidic structure, it is necessary to form an electric field at a position where the droplet 9 is expected to reach. Since the auxiliary electrode 6 is provided, if there is an auxiliary electrode 6 at least a part of which is located at the position where the droplet is expected to reach, the driving voltage may be applied to the auxiliary electrode 6 to assist driving of the droplet 9, in addition to applying the driving voltage to the driving electrode 51 located at the position where the droplet is expected to reach.

According to an embodiment of the present disclosure, in the case where the auxiliary electrode 6 has the elongated strip shape shown in FIG. 2, the same driving voltage as that applied to the driving electrode 51 at the first position may be applied to the auxiliary electrode 6 through the lead wire coupled to the auxiliary electrode 6 at the second position (as shown in FIG. 2, the lead wire 621 coupled to the second auxiliary electrode 62). In the case where the auxiliary electrode 6 has a block shape as shown in FIG. 6, since the auxiliary electrode 6 is electrically coupled to the driving electrode 51 through the via hole, the same driving voltage as that applied to the driving electrode 51 may be applied to the auxiliary electrode 6.

Figure 7:
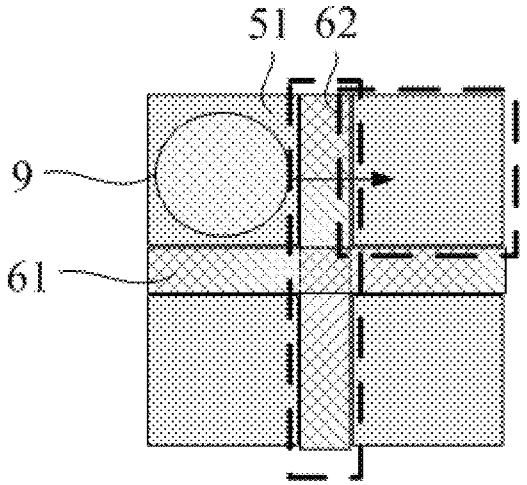
FIG. 7 is a schematic diagram of a micro-fluidic structure in driving a droplet to move according to an embodiment of the present disclosure.
Figure 8:
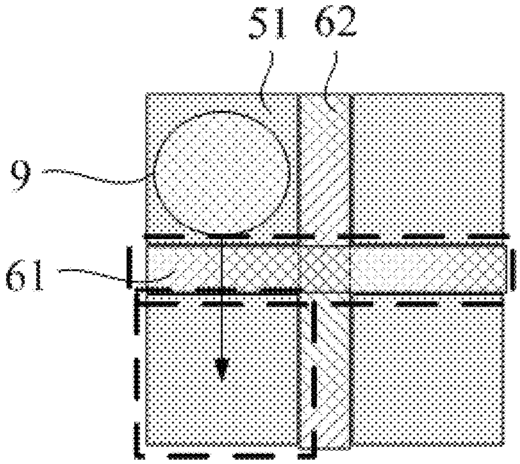
FIG. 8 is another schematic diagram of a micro-fluidic structure in driving a droplet to move according to an embodiment of the present disclosure.
Figure 9:
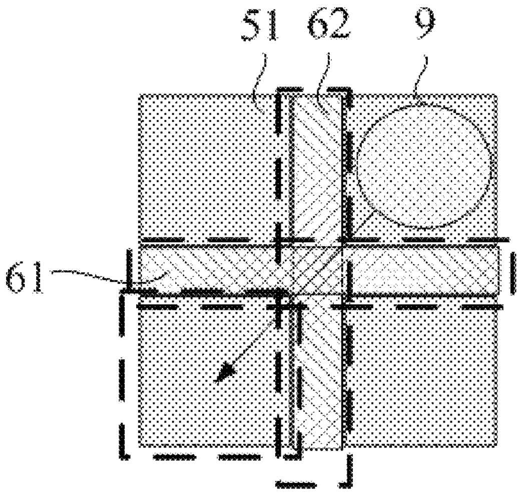
FIG. 9 is yet another schematic diagram of a micro-fluidic structure in driving a droplet to move according to an embodiment of the present disclosure.

For example, when the droplet 9 in FIG. 7 needs to move to the right, a high voltage may be applied to the second auxiliary electrode 62 and the driving electrode 51 on the right side thereof (marked by a dashed line frame in the figure). When the droplet 9 in FIG. 8 needs to move downward, a high voltage may be applied to the first auxiliary electrode 61 and the driving electrode 51 on the lower side thereof (marked by a dashed line frame in the figure). When the droplet 9 in FIG. 9 needs to move to the lower left, a high voltage may be applied to the first auxiliary electrode 61 on the lower side thereof, the second auxiliary electrode 62 on the left side thereof, and the driving electrode 51 on the lower left side thereof (marked by the dashed line in the figure).

When the above first auxiliary electrode 61 and second auxiliary electrode 62 are employed, as shown in FIG. 2, the end(s) of each auxiliary electrode 6 may be directly coupled to a driving chip (IC), so that they may be directly supplied with a driving voltage by the driving chip.

When the above block-shaped auxiliary electrode 6 is employed, the voltage on the auxiliary electrode 6 is supplied through the driving electrode 51 coupled thereto.

According to the embodiment of the present disclosure, the driving voltage applied to the auxiliary electrode 6 is equal to the driving voltage applied to at least one driving electrode 51 adjacent to the auxiliary electrode 6.

In the embodiment of the present disclosure, the auxiliary electrode 6 can be regarded as an extension of the driving electrode 51, so the driving voltage on the auxiliary electrode 6 may be equal to the driving voltage of a certain driving electrode 51 that is also being driven.

According to an embodiment of the present disclosure, the driving voltage applied to the auxiliary electrode 6 may be different from the driving voltages applied to the driving electrodes 51, for example, the driving voltages applied to the driving electrodes may be varied, and the specific driving voltages thereto may be obtained according to the driving requirement for the droplet 9, and will not be described in detail herein.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

The invention claimed is:

1. A micro-fluidic substrate, comprising:
- a substrate;
- a plurality of driving electrodes on the substrate and configured to drive a droplet to move, the plurality of driving electrodes being in a same layer with a gap space between adjacent driving electrodes,
- at least one auxiliary electrode on the substrate and configured to drive the droplet to move, an orthographic projection of the at least one auxiliary electrode on the substrate at least partially overlapping with an orthographic projection of the gap space on the substrate, and the auxiliary electrode and the driving electrodes being in different layers; and
- a plurality of driving transistors each coupled to a corresponding one of the plurality of driving electrodes,
- wherein the micro-fluidic substrate further comprises a plurality of first gate lines extending in a row direction, a plurality of driving lines extending in a column direction, wherein the plurality of driving transistors and the plurality of driving electrodes are arranged in an array and in one-to-one correspondence, wherein
- each of the plurality of driving electrodes is coupled to a first electrode of the driving transistor corresponding thereto, gate electrodes of the driving transistors corresponding to each row of the driving electrodes are coupled to one of the first gate lines, and second electrodes of the driving transistors corresponding to each column of the driving electrodes are coupled to one of the driving lines, and
- the orthographic projection of the at least one auxillary electrode on the substrate covers the first gate line.

2. The micro-fluidic substrate of claim 1, further comprising a plurality of second gate lines extending in the row direction, a plurality of detection lines extending in the column direction, a plurality of photosensitive elements on the substrate and a plurality of detection transistors in one-to-one correspondence with the plurality of photosensitive elements, wherein
- the plurality of photosensitive elements are arranged in an array, each of the photosensitive elements is coupled to a first electrode of a corresponding one of the detection transistors, gate electrodes of the detection transistors corresponding to each row of the photosensitive elements are coupled to one of the second gate lines, and second electrodes of the detection transistors corresponding to each column of the photosensitive elements are coupled to one of the detection lines, and
- orthographic projections of the plurality of second gate lines on the substrate overlap with orthographic projections of the plurality of photosensitive elements on the substrate.

3. The micro-fluidic substrate of claim 2, wherein
- an orthographic projection of each of the plurality of driving electrodes on the substrate covers an orthographic projection of a corresponding one of the plurality of driving transistors on the substrate and an orthographic projection of a corresponding one of the plurality of detection transistors on the substrate.

4. The micro-fluidic substrate of claim 1, wherein the at least one auxiliary electrode comprises a plurality of auxiliary electrodes each having a block shape, each auxiliary electrode is arranged at the gap space and is electrically coupled to the driving electrode adjacent thereto.

5. The micro-fluidic substrate of claim 4, wherein, the gap space comprises a row gap space between adjacent rows of the driving electrodes and a column gap space between adjacent columns of the driving electrodes, and a distance between the auxiliary electrodes adjacent in the row gap space is less than a distance between the auxiliary electrodes adjacent in the column gap space.

6. The micro-fluidic substrate of claim 4, wherein, a width of the auxiliary electrode is greater than the gap space between two adjacent driving electrodes of the plurality of the driving electrodes.

7. The micro-fluidic substrate of claim 1, wherein, the orthographic projection of the auxiliary electrode on the substrate overlaps with the orthographic projections of two driving electrodes adjacent to the auxiliary electrode on the substrate.

8. The micro-fluidic substrate of claim 4, wherein, the plurality of auxiliary electrodes are electrically isolated from each other.

* * * * *